United States Patent [19]

vander Have

[11] 4,355,537

[45] Oct. 26, 1982

[54] TEMPERATURE COMPENSATION FOR TRANSDUCER COMPONENTS

[75] Inventor: Leonard A. vander Have, Milford, Conn.

[73] Assignee: Combustion Engineering, Inc., Windsor, Conn.

[21] Appl. No.: 262,072

[22] PCT Filed: Aug. 4, 1980

[86] PCT No.: PCT/US80/01000

§ 371 Date: Nov. 6, 1980

§ 102(e) Date: Nov. 6, 1980

[87] PCT Pub. No.: WO82/00519

PCT Pub. Date: Feb. 18, 1982

[51] Int. Cl.³ .............................................. G01L 19/04
[52] U.S. Cl. ...................................... 73/708; 73/766; 73/862.63
[58] Field of Search ...................... 73/708, 766, 862.63, 73/862.67; 324/105

[56] References Cited

U.S. PATENT DOCUMENTS

| | | | |
|---|---|---|---|
| 3,841,150 | 10/1974 | Pearson | 73/708 |
| 3,995,493 | 12/1976 | Nishihara | 73/708 |
| 4,000,643 | 1/1977 | Pearson | 73/708 |
| 4,011,758 | 3/1977 | Reenstra | 73/708 |
| 4,233,848 | 11/1980 | Sato . | |

Primary Examiner—Donald O. Woodiel
Attorney, Agent, or Firm—L. James Ristas

[57] ABSTRACT

A circuit for compensating the temperature dependence of the deformation properties of a pressure transducer sensor, having four basic parts: a current source having an output proportional to the sensor temperature, a constant voltage source, a Norton divider, and an operational amplifier. One brach of the Norton divider is a variable conductance ladder having an output current which increases at a programmed rate as the current from the temperature dependent source increases. The programmed rate is based on the temperature-dependent characteristic of the transducer sensor. The two branches of the Norton divider are connected as inputs to the operational amplifier. The operational amplifier provides the output of the compensating circuit, which is the difference between the reference voltage of the voltage source and the voltage at the output of the variable conductance ladder. As the current source increases, the output voltage of the amplifier is reduced such that the temperature dependence of the output voltage is a close approximation to the inverse of the temperature dependence of the sensor deformation characteristic.

8 Claims, 3 Drawing Figures

TEMPERATURE COMPENSATION FOR TRANSDUCER COMPONENTS

BACKGROUND OF THE INVENTION

The invention relates to temperature compensation for a transducer device, and more particularly to electronically compensating for the temperature dependence of the deformation properties of the sensor element of the transducer.

For many kinds of transducer devices, such as differential pressure transmitters, it is necessary that the effects of temperature be accounted for so that the pressure measurement itself is not temperature dependent. In one kind of differential pressure transducer, a metal diaphragm is sealed between two chambers which are at different pressures. An electric coil, such as an "E core", is located in each chamber on either side of the diaphragm. The E cores form branches on a bridge and are excited by a voltage signal generator. The pressure differential acting on the diaphragm displaces the diaphragm and this displacement changes the magnetic coupling of the E cores. The diaphragm displacement is sensed by the transducer system as a change in reluctance, which through the bridge may be displayed or recorded as a pressure differential.

The displacement of the diaphragm is ideally proportional to the pressure difference between the chambers of the transducer device. However, the stress and strain relationship of the diaphragm is temperature dependent, i.e., a given pressure differential will displace the diaphragm a different amount depending on the temperature of the diaphragm. This material property of the diaphragm must be compensated or accounted for if a high degree of transducer accuracy is required.

Particularly when used in nuclear power plants, differential pressure transducers should be accurate to within ±1% over a temperature range of about 40° F. to 250° F. This kind of accuracy is not obtainable with transducers currently available commercially. Although commercially available transducers are capable of compensating for temperature effects arising in the electronic circuit itself, i.e., in the diodes and transistors, it is believed that no satisfactory means have previously been found for specifically compensating the temperature dependence of the material properties of the sensor itself.

SUMMARY OF THE INVENTION

The present invention provides an improvement over the prior art transducers in that the temperature dependence of the sensor element, such as the deformation characteristic of the diaphragm in a differential pressure transducer, is specifically accounted for by providing a compensating circuit having an output voltage which varies inversely with the temperature dependence of the sensor element.

The compensating circuit comprises four basic parts: a current source having an output proportional to the sensor temperature, a constant voltage source, a Norton divider, and an operational amplifier. One branch of the Norton divider is a variable conductance ladder having an output current which increases at a programmed rate as the current from the temperature dependent source increases. The programmed rate is based on the temperature-dependent characteristic of the transducer sensor. The two branches of the Norton divider are connected as inputs to the operational amplifier. The operational amplifier provides the output of the compensating circuit, which is the difference between the reference voltage of the voltage source and the voltage at the output of the variable conductance ladder. As the current source increases, the output voltage of the amplifier is reduced such that the temperature dependence of the output voltage is a close approximation to the inverse of the temperature dependence of the sensor deformation characteristic.

The invention provides several advantages not available with known compensated transducers. Most importantly, the temperature dependence of the sensor element itself is accounted for by a piece-wise linear approximation which can be made as accurate as necessary by providing a sufficient number of sequential conductance paths in the variable conductance ladder. In the preferred embodiment the ladder consists of diodes and resistances, which are extremely accurate in their operation. This is in contrast to temperature compensating devices used in the prior art, such as thermistors and resistor-temperature devices (RTD's), which cannot provide the accuracy of ±1% over the temperature range desired for use, for example, in nuclear power plants. The present invention, when used in conjunction with other state-of-the-art transducer equipment, should permit this kind of accuracy.

Another advantage is that field adjustments made on the preferred embodiment of the invention very easily accommodate the slight variations among transducers manufactured from the same specification. In the preferred embodiment of the invention, a first programmable resistance is provided to remove a fixed amount of current from the variable conductance ladder whereby the circuit may be calibrated to provide a known output voltage at any reference temperature. Also, a second programmable resistance may be provided between the amplifier output and the variable conductance ladder for the purpose of adjusting the gain on the piece-wise linear approximations provided by the ladder. This adjustment is needed, for example, to account for the slighty varying diaphragm thicknesses from transducer to transducer.

DESCRIPTION OF THE PREFERRED EMBODIMENT

Figure 1:
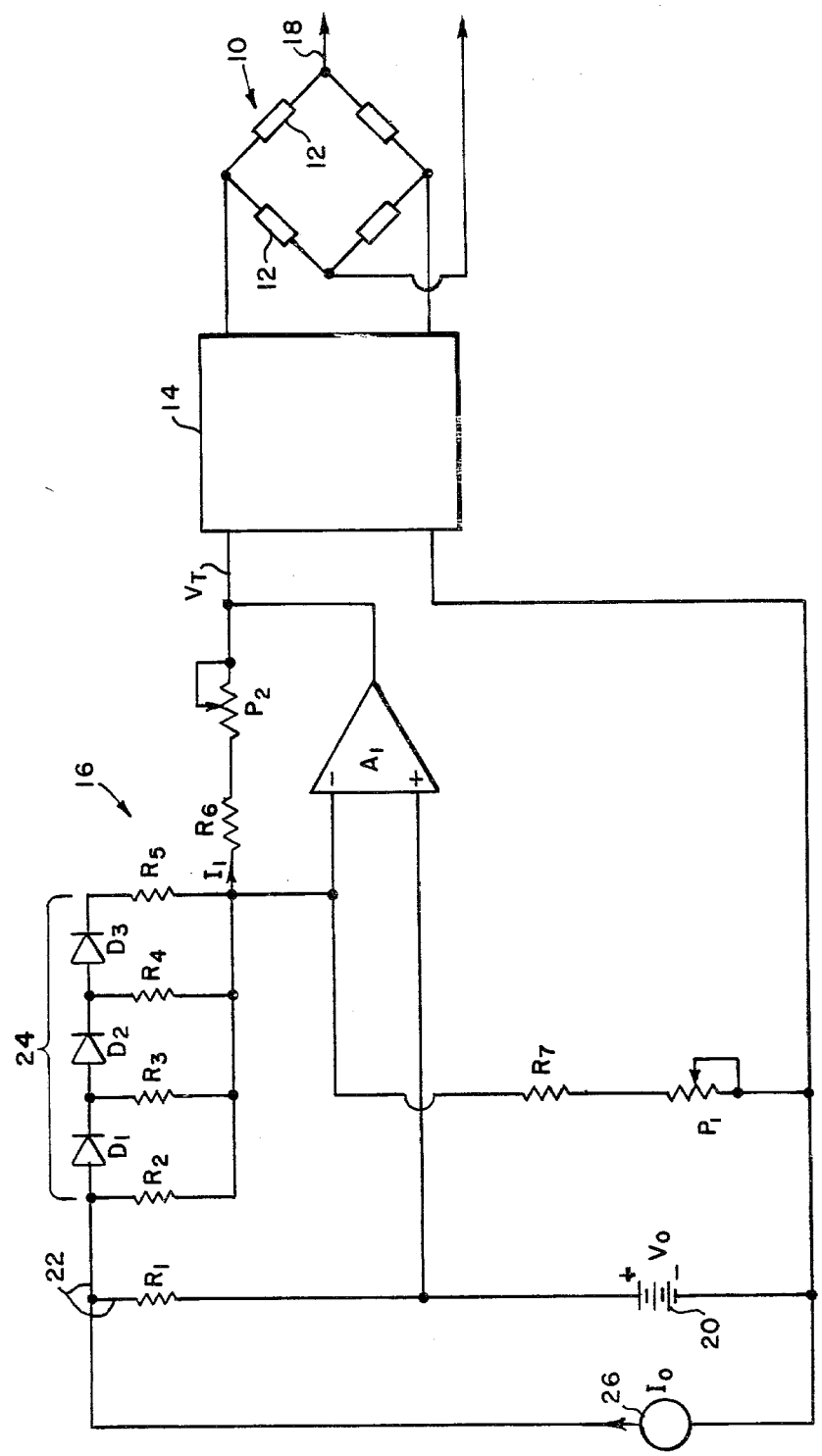
FIG. 1 diagramatically illustrates an electrical circuit embodying the invention.

FIG. 1 diagramatically shows a transducer system including a reluctance resistance bridge 10 having coils 12, such as E cores, for measuring the pressure differential across a sensor element such as a diaphragm (not shown). This bridge is activated by a signal generator 14 which provides an AC excitation to the bridge 10. Such a bridge and signal generator arrangement, or equivalents thereof for purposes of the invention, are more fully described in several prior art references, including U.S. Pat. Nos. 3,995,493 Differential Pressure Transducer, and 4,011,758 Magnitostrictive Pressure Transducer, which are hereby incorporated by reference. In the prior art, the ac output voltage signal from the signal generator to the bridge typically has an amplitude that is independent of sensor temperature.

Figure 2:
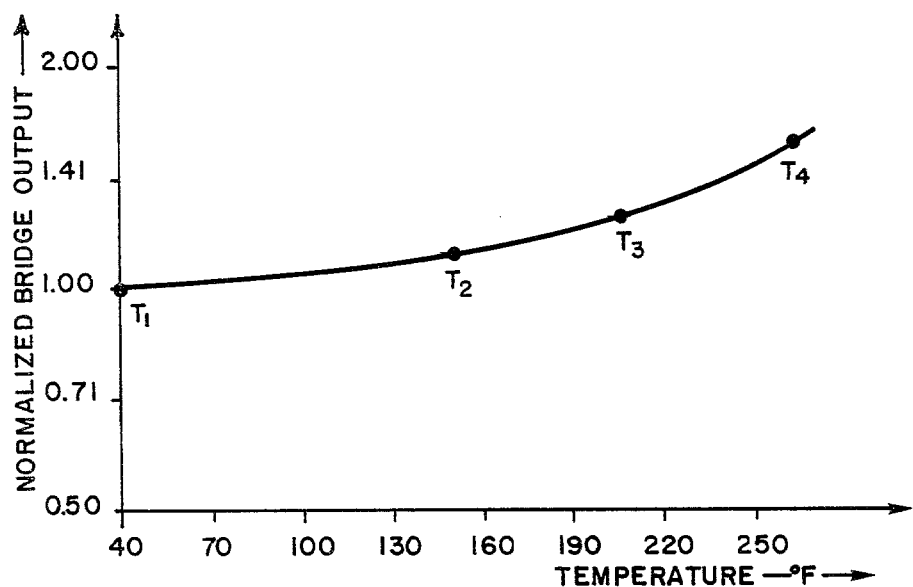
FIG. 2 graphically illustrates the behavior of a transducer system output as a function of sensor temperature, in the absence of temperature compensation.

Referring also to FIG. 2, the normalized bridge output 18 as a function of sensor temperature is shown. It may be seen that over a temperature range of 40° F. to 250° F., the bridge output 18 can vary by as much as 50% for the same pressure differential applied across the sensor diaphragm. This temperature effect must be accurately compensated if transducer accuracy over this temperature range is to be maintained within a few percent.

In the illustrated embodiment, the present invention modifies the ac output of the signal generator 14 such that the temperature compensation is made in the transducer activation or excitation signal, rather than in the transducer output signal 18. In effect, the amplitude of the ac output of the signal generator is reduced according to the temperature of the sensor such that the activation voltage varies inversely with the temperature dependence of the material in the sensor.

Figure 3:
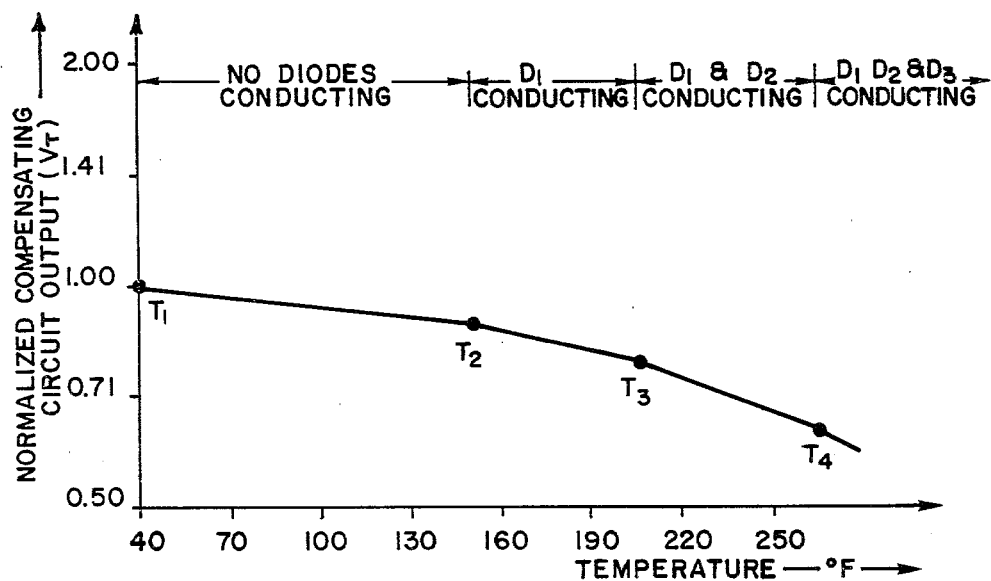
FIG. 3 graphically illustrates the temperature compensated output of the inventive circuit, which is provided as an input to the signal generator of the transducer system.

FIG. 3 shows the voltage output of the inventive circuit, $V_T$, as a function of sensor temperature; the output $V_T$ of the compensating circuit is input to the signal generator 14 of the transducer system. It may be seen by comparing FIG. 3 with FIG. 2, that at a given temperature the product of the two normalized curves is 1.00, which in effect removes the temperature dependence from the normalized bridge output signal 18. Thus, the bridge output will be the same for the same pressure differential at any temperature between 40° F. and 250° F.

It should be appreciated that although the normalized bridge output shown in FIG. 2 is a smooth curve having a smooth transition in temperature through points T1, T2, T3, T4, the compensation curve shown in FIG. 3 is piece-wise linear between T1, T2, T3, and T4. The number of piece-wise linear approximations required to compensate the inherent temperature dependence of the sensor is determined by the degree of accuracy required and the curvature of the temperature dependence of the sensor. For the sensor behavior represented in FIG. 2, it has been found that a three segment piece-wise linear approximation is sufficient. In connection with the following description of the inventive circuit, it should be appreciated that the number of legs on the variable conductance ladder, which provides the piece-wise compensation, will depend on the judgment of the designer and the accuracy desired.

Referring again to to FIG. 1, there is shown a temperature compensated voltage $V_T$ which is the output of the inventive compensating circuit 16 and an input to the signal generator 14. The voltages to be described in connection with the inventive compensating circuit 16 are relative to a common of the signal generator 14 and bridge portion 10 of the transducer system. The compensating circuit includes a current source 26 maintained at substantially the same temperature as the sensor element (not shown) and having an output Io that is linear with temperature. Such a device is commercially available as, for example, LM-134 from the National Semiconductor Company or part AD-590 from the Analog Devices Corporation. This current source 26 is preferably located as close as possible to the sensor element. A suitable current source provides one microampere change in current per °K change in temperature.

A voltage source 20, preferably in the range of 5 to 10 volts, provides a base or reference voltage Vo corresponding to the base or reference output of the current source at the calibration temperature. The circuit is initially calibrated so that at 40° F. and with a corresponding source current of about 278 micro-amperes, the output voltage $V_T$ is exactly equal to the source voltage Vo. This is done by proper choice of resistance R7, or by providing a programmable resistance P1 which can be adjusted to force $V_T$ to equal Vo at the calibration temperature.

The resistor R1 is connected with the variable conductance ladder 24, illustrated in the form of a resistive diode matrix R2, R3, R4, R5 and D1, D2, D3, to form a Norton divider at 22. R1 is connected to the voltage source 20 and the positive input of the operational amplifier A1, and the ladder is connected to the negative input of the amplifier.

The operational amplifier A1 performs the following operation:

$$V_T = Vo - I_1 \times (R_6 + P_2)$$

where R6 and P2 will be explained below. I1 is the fractional current which passes through the variable conductance ladder 24.

At the calibration temperature, e.g., 40° F., $V_T = Vo$, Io passes through R1 and R2, and $I_1 = 0$ as controlled by R7 and P1. The diodes D1, D2 and D3 are non-conducting. As the temperature of the sensor increases and the current source Io increases, an increasing amount of current flows through resistor R2, which is a constant fraction of the current Io. According to the rule of the operational amplifier as described above, as I1 increases an ever increasing voltage is subtracted from Vo so that the compensating circuit output voltage $V_T$ decreases as Io increases.

Referring now to FIGS. 1 and 3, the $V_T$ has a constant slope between 40° F. and 150° F. As the voltage across R2 increases to about 0.7 volts, diode D1 becomes conducting and resistor R3 is added to the circuit. As Io continues to increase, voltage $V_T$ follows the linear relationship represented between the points T2 and T3. Likewise, when the voltage across D2 reaches about 0.7 volts, resistant R4 comes into operation and the sequence continues for as many legs of the ladder are necessary to satisfactorily model the temperature behavior of the sensor material. The variable conductance ladder 24 therefore has a current output that is piece-wise linear with increasing current Io from the current source 26. The piece-wise linearity is programmed into the ladder on the basis of the information known to the designer from FIG 2. This information is ideally obtained from measurements on the uncompensated transducer system 10, 14, but can also be satisfactorily estimated from published data on the material properties of the particular sensor material.

It may be appreciated that in a typical nuclear power plant dozens of nominally identical differential pressure transducers may be required. It would be desirable that temperature compensation in each of the transducers be as uniform as possible. The preferred embodiment of the present invention provides features that permit easy calibration whereby each transducer may be individually adjusted to have the same reference conditions as the other transducers. For example, all compensating circuits 16 can be adjusted to provide the same output voltage $V_T$ at 40° F. Or, each compensating circuit 16 can be adapted so that its output voltage $V_T$ at the reference condition will match the nominal ac output voltage of the signal source 14. In effect, the output voltage $V_T$ at the reference condition, e.g., 40° F., can be raised or lowered by the first programmable resistant $P_1$ connected to the variable conductance ladder 24. $P_1$ removes a fixed amount of current from the ladder independent of the strength of the current source Io. This way, individual differences in the amount of current produced at 40° F. for different current sources 26, can be offset to provide the same output voltage $V_T$ in each compensating circuit at 40° F.

Another adjustment which can easily be made with the preferred embodiment of the invention is a gain adjustment on the slope of the piece-wise linear segments shown in FIG. 3. It should be appreciated that a shipment of transducer systems may all have the same specifications on the diaphragm thickness, for example, but variations will in practice occur. These variations can be accounted for by a second programmable resistance $P_2$ connected between the compensating circuit output $V_T$ and the variable conductance ladder 24 whereby the amplifier signal is fed back through the second programmable resistance $P_2$. This adjustment is a ratio adjustment in which each of the slopes shown in FIG. 3 is adjusted by a constant factor.

The preferred embodiment of the invention has been described in which the temperature dependence of the stress/strain relationship of a metal diaphragm is to be electronically compensated. The invention may be used in any system wherein Hook's Law or an analogue thereof is the material property forming the basis of the desired measurement, but where compensation for the variability of the temperature is desired. The details of providing specific values for the circuit devices disclosed in the preferred embodiment, or constructing an equivalent circuit, will be obvious to one ordinarily skilled in this art. Likewise, the use of the invention in a totally resistive transducer system wherein a dc signal generator may be employed, or in modifying the transducer system output rather than the input, will be evident to the ordinary practitioner.

I claim:

1. An electrical circuit for compensating the temperature dependence of a sensor element in a transducer system, the system having a signal generator for activating the sensor element, comprising:

a current source maintained at substantially the same temperature as the sensor element and having an output that is linear with temperature;

a temperature-independent reference voltage source;

a variable conductance ladder connected as one branch of a Norton divider having a fractional input current from said current source and a current output that is piece-wise linear with increasing current from said current source;

an operational amplifier connected between the variable conductance ladder and the voltage source, and having an output which is the difference between the reference voltage and a voltage which is proportional to the fractional current passing through the variable conductance ladder;

whereby the output voltage of the amplifier varies inversely in accordance with the temperature dependent properties of the sensor.

2. The compensating circuit of claim 1 further comprising a first resistance connected to the variable conductant ladder for removing a fixed amount of current from the ladder independent of the current source.

3. The compensating circuit of claim 1 further comprising a second resistance connected between the amplifier output and the ladder whereby the amplifier signal is fed back through the second resistance.

4. The compensating circuit of claim 3 wherein the Norton divider comprises resistance $R_1$ connected at one end to the current source and at the other end of the voltage source and to one input of the amplifier, and a resistive diode matrix connected in parallel with $R_1$ between the current source and the other input to the operational amplifier.

5. The compensating circuit of claim 1 further comprising a first programmable resistance connected to the variable conductance ladder for removing a fixed amount of current from the ladder independent of the strength of the current source.

6. The compensating circuit of claims 1 or 5 further comprising a second programmable resistance connected between the amplifier output and said ladder whereby the amplifier signal is fed back through the second programmable resistance.

7. The compensating circuit of claim 1 wherein the variable conductance ladder comprises a resistive diode matrix.

8. The compensating circuit of claim 1 wherein the amplifier output is connected to a signal generator for activating the sensor element.

* * * * *

UNITED STATES PATENT AND TRADEMARK OFFICE
CERTIFICATE OF CORRECTION

PATENT NO. : 4,355,537
DATED : Oct. 26, 1982
INVENTOR(S) : van der Have

It is certified that error appears in the above—identified patent and that said Letters Patent is hereby corrected as shown below:

Column 6, line 29, change "of" to "to".

Signed and Sealed this

Thirtieth Day of August 1983

[SEAL]

Attest:

GERALD J. MOSSINGHOFF

Attesting Officer

Commissioner of Patents and Trademarks